（12） United States Patent
Toyota et al.

(10) Patent No.: US 6,240,641 B1
(45) Date of Patent: Jun. 5, 2001

(54) METHOD OF FORMING A LUBRICATING FILM ON A LINEAR MOTION BALL BEARING

(75) Inventors: Hiroshi Toyota; Kazunori Hayashida; Hiroaki Takebayashi, all of Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/498,001

(22) Filed: Feb. 4, 2000

Related U.S. Application Data

(62) Division of application No. 08/836,392, filed on Jul. 18, 1997.

(30) Foreign Application Priority Data

Sep. 11, 1995 (JP) .................................... 7-232610
Sep. 9, 1996 (JP) .................................... 8-237503

(51) Int. Cl.[7] ............................................. B21D 53/10
(52) U.S. Cl. .................................... 29/898.03; 29/898.12; 29/898.13
(58) Field of Search .................... 29/898.03, 898.046, 29/898.054, 898.056, 898.059, 898.1, 898.13, 898.12, 527.2, 458; 384/909; 464/168

(56) References Cited

U.S. PATENT DOCUMENTS 3,844,628  *  10/1974  McCloskey ........................... 308/6 C
4,685,184  *   8/1987  Satkamp ........................... 29/148.4 R

FOREIGN PATENT DOCUMENTS

1163423    *  9/1969  (GB) ............................... B29D/3/00
2 166 142A *  4/1986  (GB) ............................... F16C/32/20
2279 998A  *  1/1995  (GB) ............................... F16C/33/20

* cited by examiner

Primary Examiner—S. Thomas Hughes
Assistant Examiner—Marc C. Butler
(74) Attorney, Agent, or Firm—Birch, Stewart, Kolasch & Birch, LLP

(57) ABSTRACT

A process for forming a lubricating film on a direct acting bearing includes the steps of forming a liquid film on at least the rolling and sliding portions of the direct acting bearing by using a solution prepared by diluting a fluorine-containing polymer in a solvent. The liquid film is then cured to form a solid film of a fluorine-containing polyurethane high molecular compound on the direct acting bearing.

6 Claims, 6 Drawing Sheets

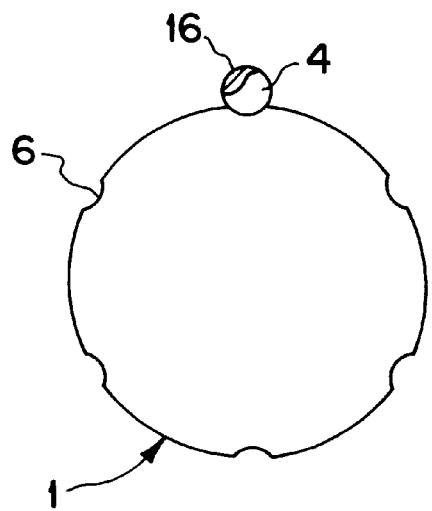
FIG. 3
FIG. 4(a)
FIG. 4(b)
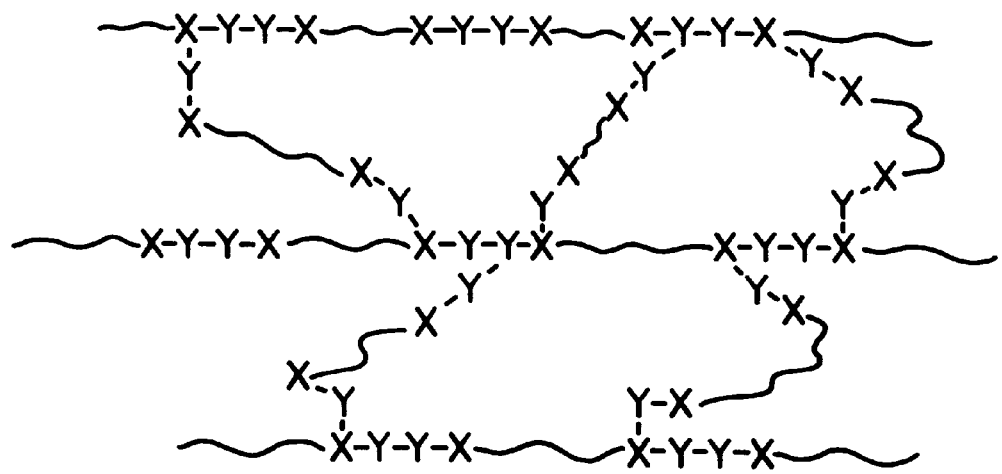

METHOD OF FORMING A LUBRICATING FILM ON A LINEAR MOTION BALL BEARING

This application is a divisional of application Ser. No. 08/836,392, filed on Jul. 18, 1997 now U.S. Pat. No. 6,126,319. Application Ser No. 08/836,392 is the national phase of PCT International Application No. PCT/JP96/02580 filed on Sep. 10, 1996 under 35 U.S.C. §371. The entire contents of each of the above-identified applications are hereby incorporated by reference.

TECHNICAL FIELD

The present invention relates to a direct-acting bearing and a process for forming a lubricating film on a direct-acting bearing. More particularly, the present invention relates to a direct-acting bearing which is suitable for use in, for example, a vacuum, clean or corrosive environment not permitting the use of any ordinary grease or oil.

BACKGROUND ART

A conveying system installed in an apparatus for manufacturing semiconductors can, for example, be mentioned as such an environment. If grease is used as a lubricant for a direct-acting bearing in such an environment, the evaporation of oily matter from the grease causes problems, such as a lowering of its lubricating property and the pollution of the environment.

In such an event, it has hitherto been usual to coat at least one of the track surface of a rail in the form of a shaft, or a cylindrical movable body, or the surfaces of rolling bodies with a film of a solid lubricant, such as a soft metal such as gold, silver, lead or copper, or carbon, or molybdenum disulfide. The coating film formed from a solid lubricant as stated above, however, comes off little by little with the rolling or sliding motions of the rolling bodies. This causes an amount of dust which is inadequate for, among others, a clean environment, though it is a smaller amount than when grease is used. The amount of dust which is formed increases particularly under a high load.

The application of this applicant has coated the components of a direct-acting bearing with a solid lubricant obtained by mixing a fluororesin with a binder, and has made it possible to reduce dusting drastically, as compared with the usual case described above.

Even this coating film, however, produces a large amount of dust by getting worn, as well as by peeling or chipping, and has a short dust-free life, if it is subjected to a relatively high radial load. Moreover, the peeling or chipping of the coating film decreases the life to the direct-acting bearing, since it has a lower lubricating effect on the rolling and sliding portions of the bearing and allows its components to stick together and become worn more easily as a result of metal to metal contact. If the environment contains a corrosive gas, it corrodes the components of the bearing in those portions thereof from which the coating film has peeled, or chipped.

It is, therefore, an object of the present invention to restrain dusting in a direct-acting bearing and improve its lubrication to enable it to have a long life.

SUMMARY OF THE INVENTION

Construction

A first direct-acting bearing according to the present invention comprises a rail in the form of a shaft, a movable body fitted slidably to it, and a plurality of rolling bodies disposed between the rail and the movable body so as to roll and circulate with their relative sliding motion. The bearing includes a solid film of a fluorine-containing polyurethane high molecular compound formed on at least the rolling and sliding portions of its components.

A second direct-acting bearing according to the present invention comprises a rail in the form of a shaft, a movable body fitted slidably to it, and a plurality of rolling bodies disposed between the rail and the movable body so as to roll and circulate with their relative sliding motion. The rail and movable body are formed from a metal, and includes a solid film of a fluorine-containing polyurethane high molecular compound formed on at least the track surfaces of the rail and movable body.

A third direct-acting bearing according to the present invention comprises a rail in the form of a shaft, and a movable body fitted slidably to it. The bearing includes a solid film of a fluorine-containing polyurethane high molecular compound formed on at least the rolling and sliding portions of its components.

The solid film mentioned above preferably has a three-dimensional network structure. The solid film preferably contains a flowable fluorine-containing polymer dispersed therein. Moreover, the flowable fluorine-containing polymer preferably has no functional group.

A first process for forming a lubricating film on a direct-acting bearing according to the present invention comprises the steps of forming a liquid film on at least the rolling and sliding portions of the components of a direct-acting bearing by using a solution obtained by diluting in a solvent a fluorine-containing polymer having an isocyanate group as a functional group; and curing the liquid film to form a solid film of a fluorine-containing polyurethane high molecular compound having a network structure.

A second process for forming a lubricating film on a direct-acting bearing according to the present invention comprises the steps of forming a liquid film on at least the rolling and sliding portions of the components of a direct-acting bearing by using a solution obtained by diluting in a solvent a mixture of a fluorine-containing polymer having an isocyanate group as a functional group and a fluorine-containing polymer containing at least one of hydroxyl, amino and carboxyl groups; and curing the liquid film to form a solid film of a fluorine-containing polyurethane high molecular compound having a network structure.

A third process for forming a lubricating film on a direct-acting bearing according to this invention comprises the steps of forming a liquid film on at least the rolling and sliding portions of the components of a direct-acting bearing by using a solution obtained by adding a fluorine-containing polymer having no functional group to a solution obtained by diluting in a solvent a fluorine-containing polymer having an isocyanate group as a functional group or a mixture thereof with a fluorine-containing polymer containing at least one of hydroxyl, amino and carboxyl groups; and curing the liquid film partially to form a solid film of a fluorine-containing polyurethane high molecular compound having a network structure, in which the fluorine-containing polymer having no functional group is dispersed and retains its fluidity.

The fluorine-containing polymer may, for example, be perfluoro polyether having no functional group.

Function

According to this invention, the fluorine-containing polyurethane high molecular compound forms a solid film in which its molecules are closely bonded together, and which is highly resistant to peeling and wear during the rolling and sliding motions of the components of the direct-acting bearing, while reducing their rolling and sliding resistance.

Particularly, if the solid film of the fluorine-containing polyurethane high molecular compound contains a fluorine-containing polymer dispersed therein, and retaining its flowability, the flowable fluorine-containing polymer comes out of the solid film of the fluorine-containing polyurethane high molecular compound, and contributes to its lubricating action.

Effects

The solid film of the fluorine-containing polyurethane high molecular compound employed in the direct-acting bearing of the present invention, and having only a restrained likelihood to peel off, chip or get worn, as compared with the conventional coating film, while producing only a reduced level of rolling and sliding resistance, has a prolonged dust-free life and an improved lubricating property, and thereby contributes to improving the working stability and life of the bearing.

Therefore, if the direct-acting bearing of the present invention is used in an environment in which a high accuracy of work is required, as in the process of semiconductor manufacture, it hardly damages a clean atmosphere, but contributes to achieving an improved yield of semiconductor products.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a transverse sectional view of the rail, FIG. 4 is a diagram showing in a simplified form the structure of a solid film of a fluorine-containing polyurethane high molecular compound formed on the direct-acting bearing of FIG. 1.

DESCRIPTION OF THE PREFERRED EMBODIMENTS

Figure 1:
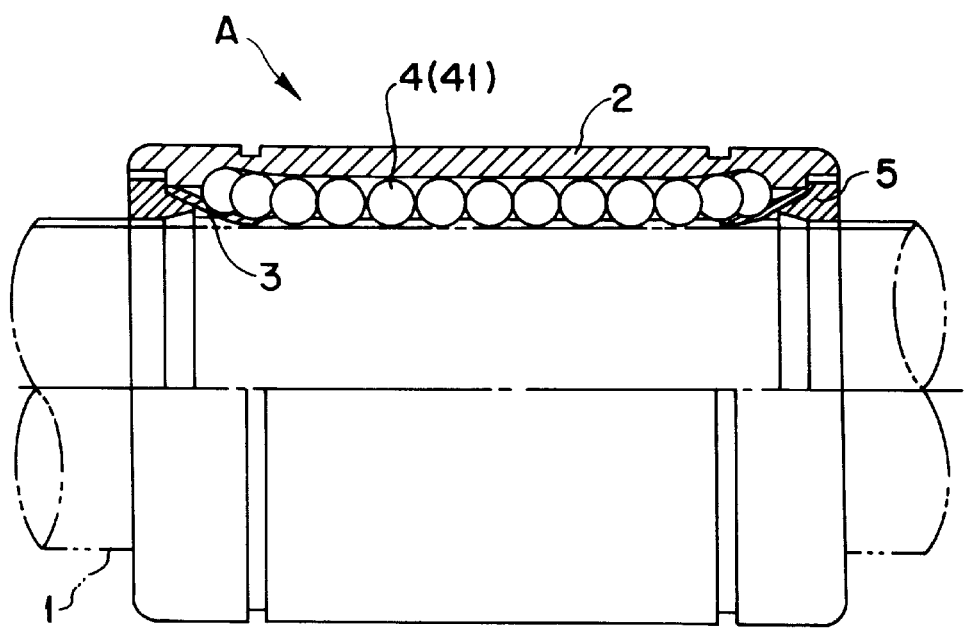
FIG. 1 is a longitudinal sectional view of a direct-acting ball bearing embodying this invention.
Figure 2:
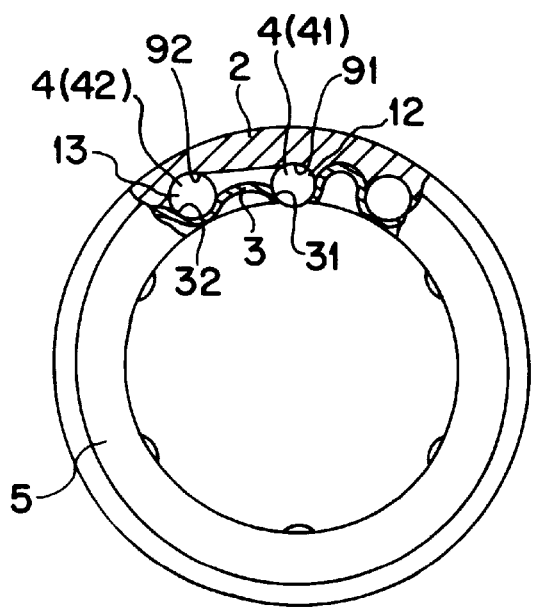
FIG. 2 is a transverse sectional view of FIG. 1.
Figure 5:
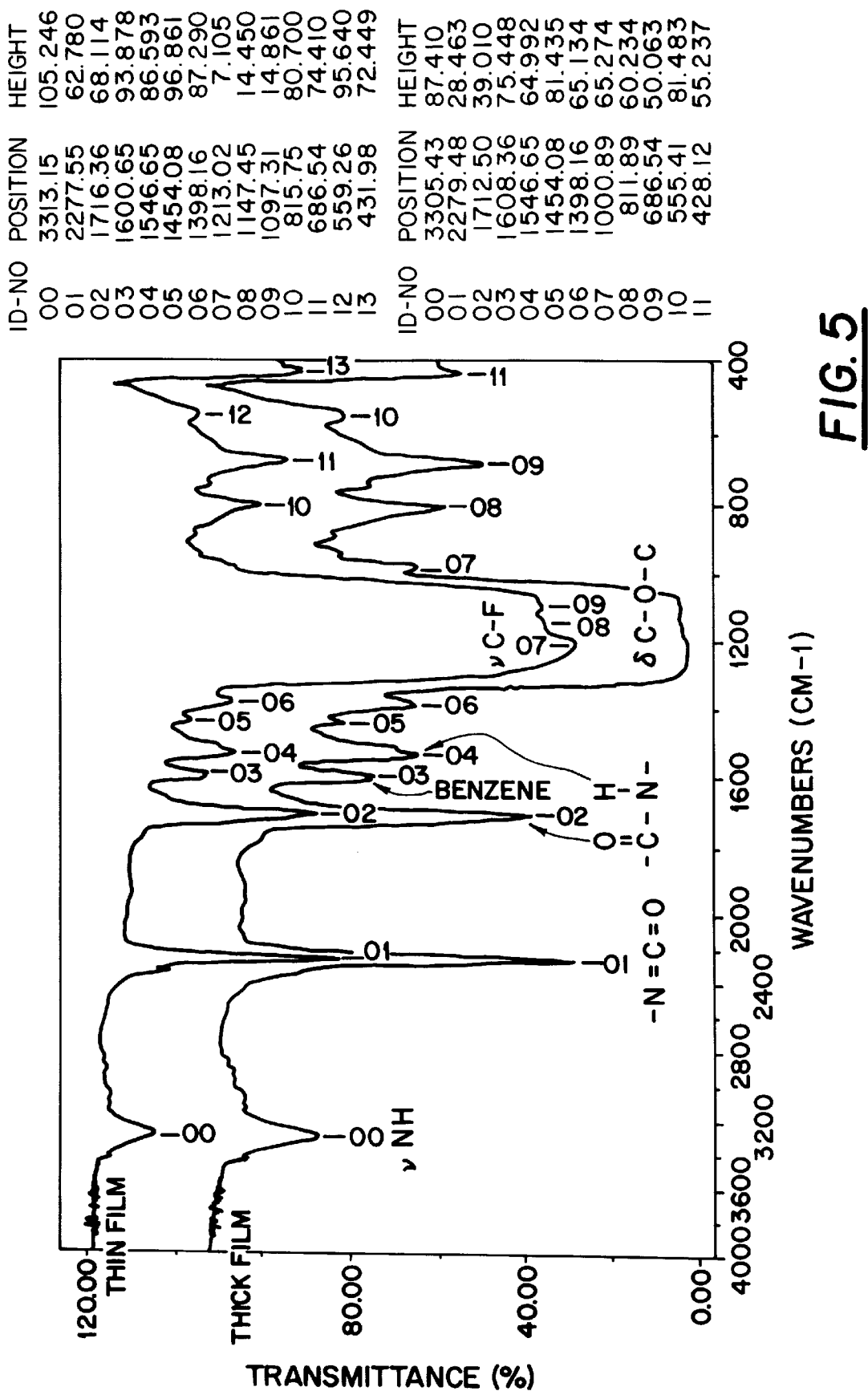
FIG. 5 is a graph showing the results of analysis in properties of a solid film of a fluorine-containing polyurethane high molecular compound prior to curing.
Figure 6:
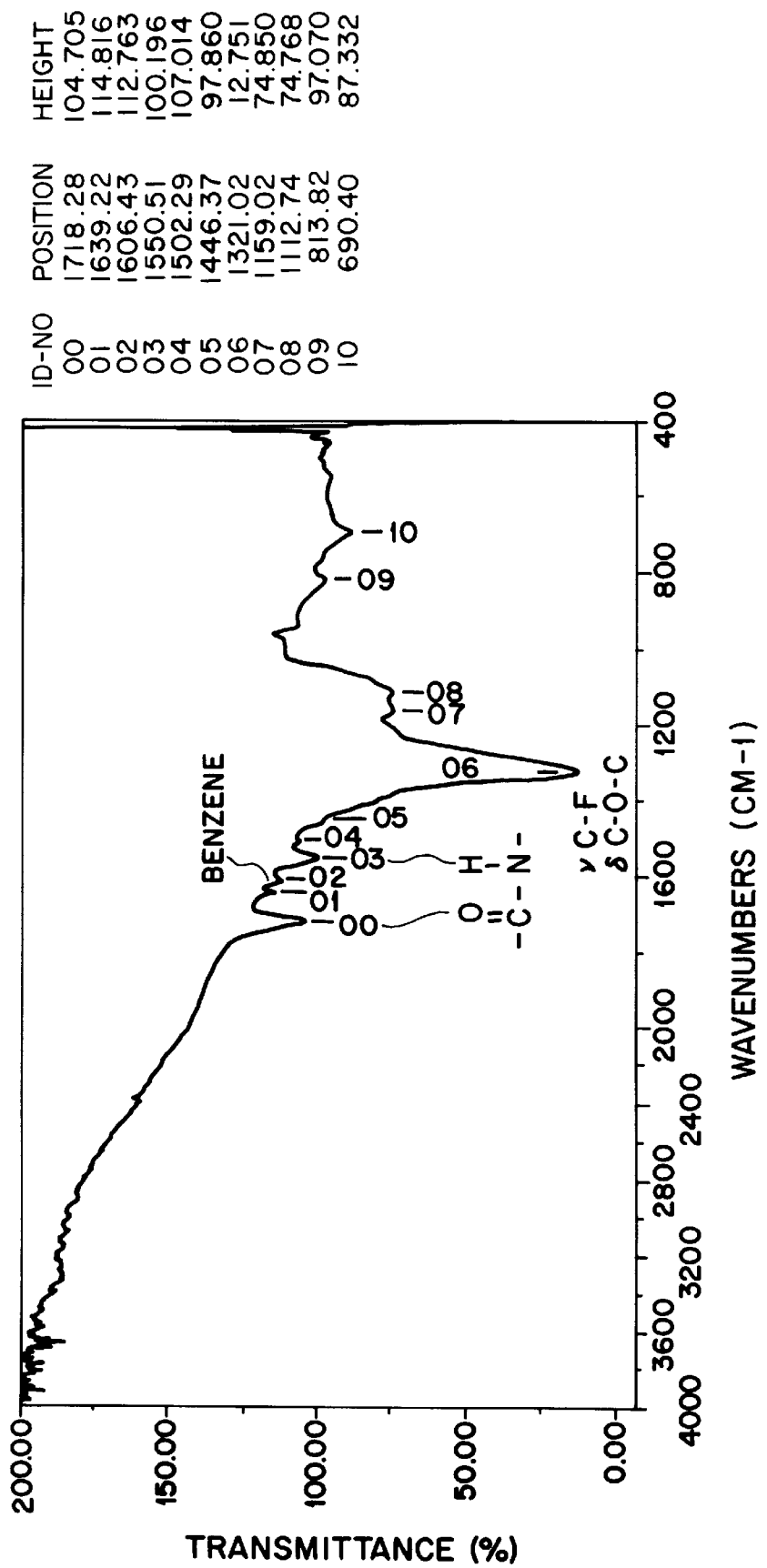
FIG. 6 is a graph showing the results of analysis in properties of the solid film as cured.
Figure 7:
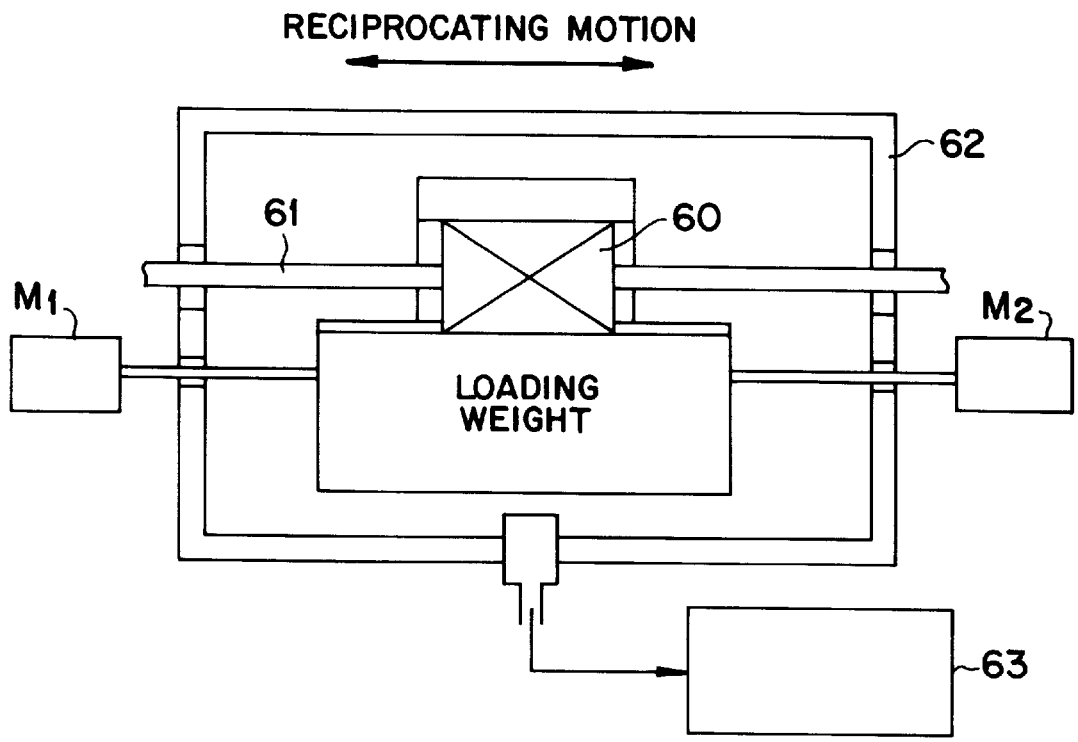
FIG. 7 is a schematic representation of a testing apparatus used for measuring the amount of dust as produced by the direct-acting bearing.
Figure 8:
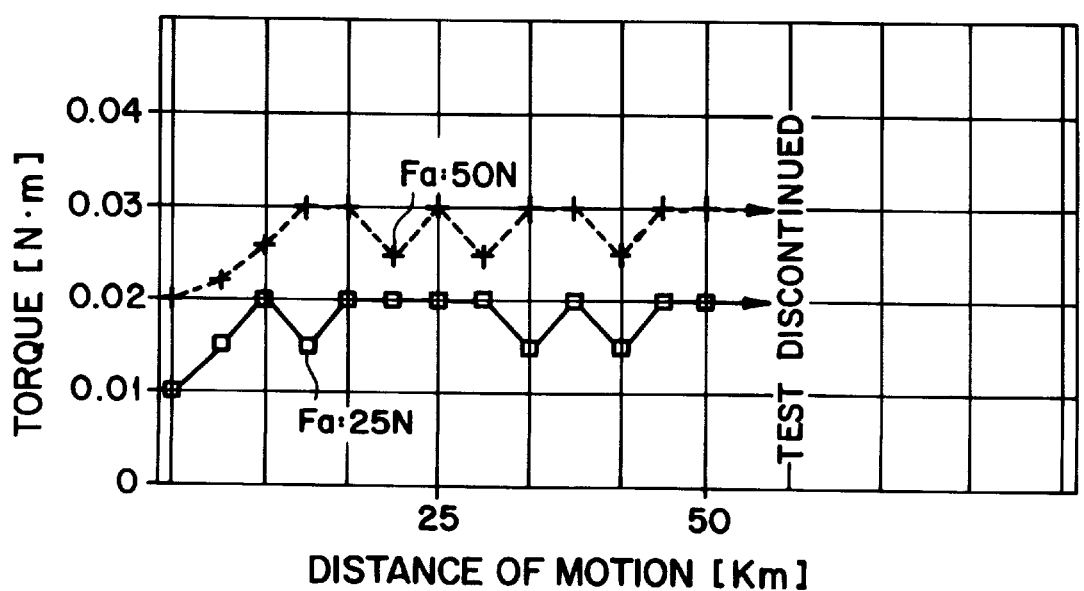
FIG. 8 is a graph showing the results of tests concerning the torque life of the direct-acting bearing.

The invention will now be described in detail with reference to FIGS. 1 to 11. FIGS. 1 to 8 show a direct-acting ball bearing embodying this invention; FIG. 1 is a longitudinal sectional view, FIG. 2 is a transverse sectional view of FIG. 1, FIG. 3 is a transverse sectional view of the rail, FIG. 4 is a diagram showing in a simplified form the structure of a solid film of a fluorine-containing polyurethane high molecular compound formed on the direct-acting bearing of FIG. 1, FIG. 5 is a graph showing the results of analysis in properties of a solid film of a fluorine-containing polyurethane high molecular compound prior to curing, FIG. 6 is a graph showing the results of analysis in properties of the solid film as cured, FIG. 7 is a schematic representation of a testing apparatus used for measuring the amount of dust as produced by the direct-acting bearing, and FIG. 8 is a graph showing the results of tests concerning the torque life of the direct-acting bearing.

In the drawings, A is a direct-acting ball bearing, 1 is a rail in the form of a cylindrical shaft, 2 is a movable body in the form of a cylindrical member, 3 is a retainer made by a press, 4 is a ball, and 5 is a retaining cylinder.

The rail 1 is made of SUS440C conforming to JIS, and has six circumferentially spaced apart and axially extending straight grooves 6 formed on an outer peripheral surface thereof and extending along the entire length thereof.

The movable body 2 is also made of SUS440C conforming to JIS, and has six circumferentially spaced apart track grooves 91 for a row of balls for circulation under load and six circumferentially spaced apart track grooves 92 for a row of balls for circulation under no load which are formed in the axially middle portion of the inner peripheral surface so as to face the adjoining grooves 6 of the rail 1 radially of the movable body 2.

The retainer 3 is made of SUS304 conforming to JIS, and has a cylindrical shape so curved as to extend along a part of the inner peripheral surface of the movable body 2. It is supported by the retaining cylinder 5 at each end. It has six annular grooves 31 and six annular grooves 32 which are symmetrically formed in its middle portion and are transversely elongated. Each annular groove 31 has no bottom along its straight portion and is provided for a row 41 of balls for circulation under load. Each annular groove 32 has a bottom and is provided for a row 42 of balls for circulation under no load.

Every two straight grooves 6 and 91 of the rail 1 and the movable body 2, respectively, facing each other form therebetween a passage 12 for transfer of balls under load, so that there are a total of six ball transfer passages 12. The balls 4 existing in each ball transfer passage 12 are located in the straight portion having no bottom of one of the annular grooves 31 of the retainer 3. Each groove 92 of the movable body 2 and the corresponding annular groove 32 having a bottom of the retainer 3 form a passage 13 for circulation of balls under no load, so that there are a total of six ball circulation passages 13. Each of the six ball transfer passages 12 and the adjacent one of the six ball circulation passages 13 are connected with each other to form a ball circulating circuit. Thus, the balls 4 roll and circulate between the ball transfer and circulation passages 12 and 13 with the axial sliding motions of the rail 1 and the movable body 2 relative to each other.

The grooves 6 of the rail 1 and the grooves 91 of the movable body 2 are each formed as having the shape of a circular arc in cross section, but may alternatively have the shape of a Gothic arch. In this case, each groove has a V-shaped cross section, and each pair of grooves 6 and 91 facing each other support the balls 4 at four points of contact. The two sloping surfaces of each of the grooves 6 and 91 are each formed as a gently curved surface. The difference between the diameter of a circumcircle formed by the balls 4 placed in each groove 6 of the rail 1 and the diameter of an inscribed circle formed by the balls 4 in the corresponding groove 91 of the movable body 2 is adjusted to apply an appropriate pressure to the balls 4, so that they may be supported at four points of contact between every pair of grooves 6 and 91.

expression used to express its chemical structure, and meaning that the molecules are continuously linked together like a network to form a dense and homogeneous structure. Such a polymer may be obtained by altering the chemical structure of a fluorine-containing polymer having functional isocyanate groups at its ends, as shown by chemical formula 1 below. A perfluoro polyether (PFPE) derivative, such as a product of Montecatini known as a FONBLIN Z derivative (FONBLIN Z DISOC, etc.), is preferably used as the fluorine-containing polymer having functional isocyanate groups at its ends.

[Formula 1]

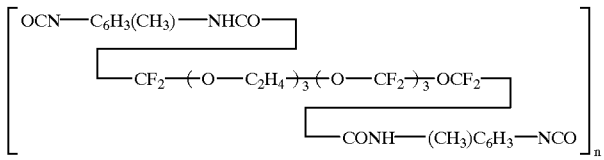

The rail 1, movable body 2, and balls 4 are formed from a corrosion-resistant material. As the corrosion-resistant material, it is possible to use, for example, a metallic material obtained by giving appropriate heat treatment for hardening to a precipitation hardening stainless steel, such as SUS630 conforming to JIS, as well as a martensitic stainless steel, such as SUS440C conforming to JIS as mentioned before. An austenitic stainless steel, such as SUS304 conforming to JIS, may alternatively be employed for use under a light load.

Besides the metallic material, it is also possible to use a ceramic material as the corrosion-resistant material for the rail 1, movable body 2, and balls 4. As the ceramic material, it is possible to use, for example, a material consisting mainly of silicon nitride ($Si_3N_4$) made by using yttria ($Y_2O_3$), alumina ($Al_2O_3$), aluminum nitride (AlN), titanium dioxide ($TiO_2$) or spinel ($MgAl_2O_4$) as a sintering assistant, alumina ($Al_2O_3$), silicon carbide (SiC), zirconia ($ZrO_2$), or aluminum nitride (AlN). The retainer 3 is preferably made of, for example, not only SUS304 conforming to JIS, but also brass or a titanium material, but may also be made of a synthetic resin material. As the synthetic resin material, it is possible to use, for example, a fluororesin such as polytetrafluoroethylene (hereinafter referred to as PTFE) or ethylene tetrafluoroethylene (ETFE), engineering plastics such as polyether ether ketone (PEEK), polyphenylene sulfide (PPS), polyether sulfone (PED) or nylon 46. These resins may contain reinforcing fibers, such as glass fibers.

A solid film 16 of a fluorine-containing polyurethane high molecular compound is formed on each of the rolling and sliding portions of the components of the direct-acting ball bearing A. Although the drawings show the solid film 16 formed only on a ball 4, it is also formed on the surfaces defining the grooves 6 of the rail 1, the grooves 91 of the movable body 2 and the annular grooves 32 of the retainer 3, and the outer surfaces thereof.

The solid film 16 of a fluorine-containing polyurethane high molecular compound contains a unit represented by the general formula —$C_xF_{2x}$—O— (where x is an integer of 1 to 4) as its main structural unit, and has a three-dimensional network structure formed by molecules having an average molecular weight of several millions or above, and linked together by urethane bonds as a result of a curing reaction. The three-dimensional network structure does not mean that the film has a cross section like a network, but is an A process for forming the solid film 16 of a fluorine-containing polyurethane high molecular compound will now be described by way of example.

(a) The rail 1, movable body 2, retainer 3, and balls 4 are dipped separately, or after they have been assembled into the direct-acting ball bearing A, in a solution prepared for forming a solid film 16 of a fluorine-containing polyurethane high molecular compound, and are turned several times, whereby the rolling and sliding portions of the rail 1, movable body 2, retainer 3, and balls 4 are coated with a liquid film (coating treatment). The solution which is prepared is a solution obtained by diluting a fluorine-containing polymer having functional isocyanate groups at its ends [a FONBLIN Z derivative (FONBLIN Z DISOC)] with a diluting solvent (a fluorine-containing solvent SV90D), and containing 1 mass % of fluorine-containing polymer.

(2) The whole of the direct-acting ball bearing A coated with the liquid film is heated at 40–50° C. for about one minute, whereby the solvent is removed from the liquid film (drying treatment). It is still a liquid film and retains fluidity.

(3) Thereafter, it is heated, for example, at 100–200° C. for 20 hours (curing treatment). As a result, the liquid film has its chemical structure altered and undergoes a curing reaction to form a solid film 16 of a fluorine-containing polyurethane high molecular compound. This curing treatment causes the individual molecules of the functional group-ending fluorine-containing polymer in the liquid film to undergo four curing reactions as shown by chemical formulas 2 to 5 below to lose the isocyanate (NCO) groups at their ends and be linked together by urethane bonds to thereby form a three-dimensional network structure. The urethane bonds are crosslinked in a linear way as shown in a simplified form in FIG. 4(*a*) as the result of the curing reactions as shown by chemical formulas 2 and 3, and in a three-dimensional way as shown in a simplified form in FIG. 4(*b*) as the result of the curing reactions as shown by chemical formulas 4 and 5.

In FIG. 4, chemical formula 1 is expressed in a simplified form as Y—X~X—Y.

[Formula 1]

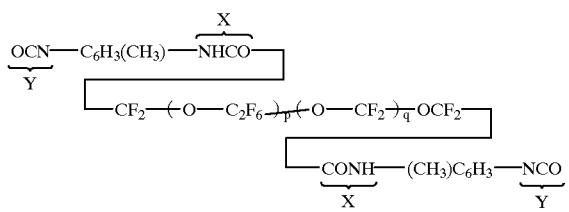

[Formula 2]

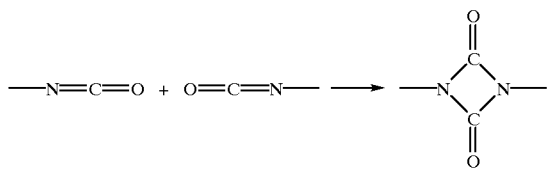

[Formula 3]

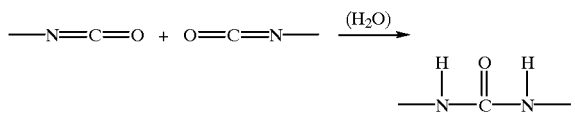

[Formula 4]

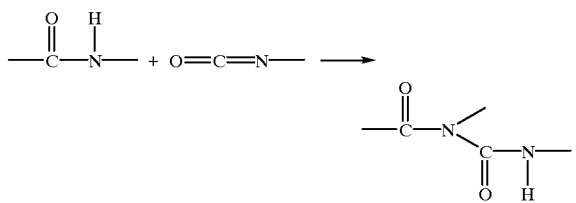

[Formula 5]

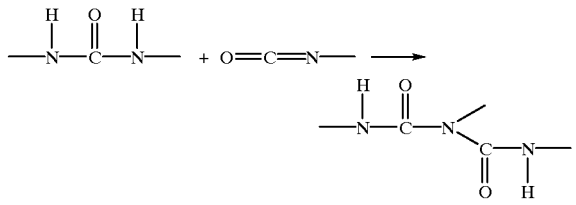

Thus, it is possible to form a solid film 16 of a fluorine-containing polyurethane high molecular compound having an adequate thickness on the mutually contacting portions of the components of the direct-acting ball bearing A. (a) and (b) may be repeated several times, if required, so that the solid film 16 may have a thickness in the range of, say, 0.1 to 3 microns depending on the use of the bearing.

The following is a description of the results of analysis made in properties of a film formed by the mere concentration and drying of the solution as prepared at (a) (which retains fluidity), and a film obtained by coating a sample, such as a stainless steel sheet, with the solution as prepared at (a), and curing it.

The former has been analyzed by the FT-IR method (the method for the Fourier transformation-infrared spectroscopic analysis of a liquid film). The results are graphically shown in FIG. 5, and reveal, besides a peak indicating a fluorine-containing polymer, peaks indicating NH (3300 cm$^{-1}$), N=C=O (2279 cm$^{-1}$), N(H)C=O (1712 cm$^{-1}$ and 1546 cm$^{-1}$), benzene (1600 cm$^{-1}$), etc. and confirm the presence of benzene rings, urethane bonds and isocyanate as functional groups. The analysis has been made for both a thin and a thick film, irrespective of their thickness. The latter has been analyzed by the FT-IR method (the method for the Fourier transformation-infrared spectroscopic analysis based on high sensitivity reflection). The results are graphically shown in FIG. 6, and reveal peaks indicating benzene rings and urethane bonds, but do not reveal any isocyanate peak. These results confirm the alteration made in chemical structure of the functional groups by the curing reactions shown by chemical formulas 2 to 5 above.

The solid film 16 of a fluorine-containing polyurethane high molecular compound as described above makes it possible to avoid any direct contact of the components of the direct-acting bearing, since its three-dimensional structure forms a dense coating on the objects to be coated, and its self-lubricating property restrains the formation of dust by wear or peeling between the components of the direct-acting bearing as a result of the rolling and sliding motions.

According to another embodiment of this invention, it is possible to add a flowably dispersed fluorine-containing polymer, such as fluoro polyether, to the three-dimensional network structure formed by the molecules linked together by the urethane bonds in the solid film 16 of a fluorine-containing polyurethane high molecular compound as described above. More specifically, the solution to be prepared for the coating treatment as described at (a) above may be of a mixture obtained by mixing in an appropriate ratio a fluorine-containing polymer having functional isocyanate groups at its ends [for example, a product known as a FONBLIN Z derivative (FONBLIN Z DISOC, etc.)] and a fluorine-containing polymer having no functional group [for example, a product known as a FONBLIN Z derivative (FONBLIN Z-60, etc.)]. The fluorine-containing polymer having no functional group does not combine with the fluorine-containing polymer having functional groups during the curing treatment (c), but is flowable in the solid film 16 of a fluorine-containing polyurethane high molecular compound and exhibits a lubricating action as by coming out of the solid film 16. The fluorine-containing polymer is not limited to the fluorine-containing polymer having no functional group as stated above, but may alternatively be a fluorine-containing polymer having functional groups as represented by chemical formula 6, 7 or 8.

[Formula 6]

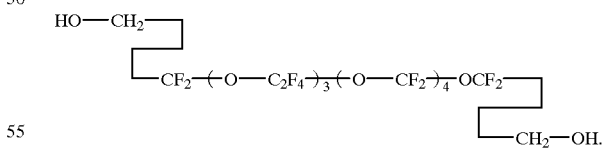

[Formula 7]

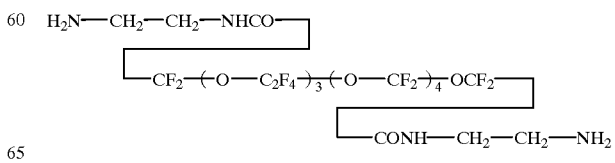

[Formula 8]

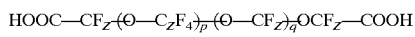

Description will now be made of the evaluation of the solid film 16 of a fluorine-containing polyurethane high molecular compound as described above for its dust-free life in an atmospheric environment and its torque life in a vacuum environment. The following description is of Examples 1 to 4 and a Comparative Example.

In Examples 1 to 4, the solid film of a fluorine-containing polyurethane high molecular compound is formed on the whole surfaces of the rail, movable body, retainer, and balls, and has a thickness of 1 micron.

In Example 1, the solid film of a fluorine-containing polyurethane high molecular compound is formed by using only a fluorine-containing polymer having functional isocyanate groups at its ends [a FONBLIN Z derivative (FONBLIN Z DISOC)].

In Example 2, the solid film of a fluorine-containing polyurethane high molecular compound is formed by adding a fluorine-containing polymer having functional hydroxyl groups (—OH) at its ends [a FONBLIN Z derivative (FONBLIN Z DOL)] to a fluorine-containing polymer having functional isocyanate groups at its ends [a FONBLIN Z derivative (FONBLIN Z DISOC)].

In Example 3, the solid film of a fluorine-containing polyurethane high molecular compound is formed by adding a fluorine-containing polymer having no functional group [a FONBLIN Z derivative (FONBLIN Z-60)] to a fluorine-containing polymer having functional isocyanate groups at its ends [a FONBLIN Z derivative (FONBLIN Z DISOC)].

In Example 4, the solid film of a fluorine-containing polyurethane high molecular compound is formed by adding a fluorine-containing polymer having functional hydroxyl groups at its ends [a FONBLIN Z derivative (FONBLIN Z DOL)] and a fluorine-containing polymer having no functional group [a FONBLIN Z derivative (FONBLIN Z-60)] to a fluorine-containing polymer having functional isocyanate groups at its ends [a FONBLIN Z derivative (FONBLIN Z DISOC)].

In Comparative Example, a coating film is formed on the whole surfaces of the rail, movabel body, retainer, and balls. The coating film is of a mixture obtained by dispersing polytetrafluoroethylene (PTFE) in a thermosetting synthetic resin (polyimide) as a binder, and has a thickness of 1 micron. In the coating film, heterogeneous polytetrafluoroethylene is dispersed like islands in an ocean formed by a relatively hard and dense thermosetting synthetic resin, and they form a weak bond.

An apparatus as shown in FIG. 7 is used for conducting tests. In the figure, 60 is a direct-acting ball bearing used for the tests, 61 is a rail, 62 is a casing, 63 is a particle monitor, 64 is a loading weight, and M1 and M2 are motors for driving the loading weight.

The tests are conducted under the following conditions:
Reciprocating speed: 20 to 30 mm/s
Load: Radial load (25N, 50N, 100N)
Stroke: 100 mm
Atmosphere: Air, clean bench (class 10);
  Vacuum ($2.6 \times 10^{-4}$ Pa or below)
Environmental temperature: Room temperature
Item to be measured: The number of dust particles having a diameter of 0.1 micron or above.

The direct-acting ball bearing used for the tests is a product of Koyo Seiko K.K., Model SESDM10ST5.
(1) The dust-free life tests are conducted by employing a radial load of 100N in the air at room temperature. The dust-free life tests are conducted by determining the time before which the amount of dust produced makes a total of 1000 particles/0.1 cf or more 10 times continuously, and converting it to a distance of motion. The measurements are conducted at intervals of 10 minutes. In Example 1, the FONBLIN Z derivative (FONBLIN Z DISOC) has a concentration of 1 mass %; in Example 2, the FONBLIN Z derivative (FONBLIN Z DISOC) forming a base has a concentration of 1 mass %, and the FONBLIN Z derivative (FONBLIN Z DOL) added to it has a concentration of 0.25 mass %; in Example 3, the FONBLIN Z derivative (FONBLIN Z DISOC) forming a base has a concentration of 1 mass %, and the FONBLIN Z derivative (FONBLIN Z-60) added to it has a concentration of 0.25 mass %; and in Example 4, the FONBLIN Z derivative (FONBLIN Z DISOC) forming a base has a concentration of 1 mass %, and the FONBLIN Z derivative (FONBLIN Z DOL) and the FONBLIN Z derivative (FONBLIN Z-60) added to it have a total concentration of 0.25 mass %.

The results are 10 km in Comparative Example, 15 km in Example 1, 30 km in Example 2, 60 km in Example 3 and 58 km in Example 4, and the life is longer in the order of Example 3, Example 4, Example 2, Example 1 and Comparative Example. Thus, while the solid film of a fluorine-containing polyurethane high molecular compound formed by employing only the FONBLIN Z derivative (FONBLIN Z DISOC) as according to Example 1 is superior to the film according to Comparative Example, the solid film of a fluorine-containing polyurethane high molecular compound formed by adding a FONBLIN Z derivative having or not having functional groups in its side chains to the FONBLIN Z derivative (FONBLIN Z DISOC) forming a base as according to Examples 2 to 4 is still better than the film according to Example 1.

As the solid film 16 of a fluorine-containing polyurethane high molecular compound according to any of Examples 1 to 4 is a dense and homogeneous film having a three-dimensional network structure, it is highly resistant to peeling or wear during the rolling and sliding motions of the components of the direct-acting ball bearing A.

Examples 3 and 4 show a greatly improved dust-free life of 100 km and 95 km, respectively, at a radial load of 50 N, and 300 km and 295 km, respectively, at a radial load of 25 N. Examples 2 and 1 also show similar percentages of improvement to Examples 3 and 4. Comparative Example gives an improved dust-free life of 20 km at a radial load of 50 N, but it is considerably shorter than that according to Example 3. Thus, any of Examples 1 to 4 is selectively applicable in accordance with the conditions prevailing in the environment in which the bearing is used.

It is obvious from the above results that it is better to add some lubricant to form the solid film 16 of a fluorine-containing polyurethane high molecular compound than to use only a FONBLIN Z derivative (FONBLIN Z DISOC). It is also obvious that the most preferable lubricant to be added is a FONBLIN Z derivative having no functional group in its side chains.

Therefore, the amount to be added is studied. Dust-free life (at a radial load of 100 N) has been examined by using films prepared by adding a FONBLIN Z derivative (FONBLIN Z-60) at concentrations of 0.25 mass % and 0.5 mass % to a FONBLIN Z derivative (FONBLIN Z DISOC) forming a base and having a concentration of 1 mass %. The results have been 60 km at 0.25 mass % and 04 km at 0.5 mass %, and suggest that 0.25 mass % is adequate. It is, however, possible to add a smaller or larger amount of FONBLIN Z derivative (FONBLIN Z-60) in the range of 0.1 to 0.75 mass % relative to the concentration of 1 mass % of the FONBLIN Z derivative (FONBLIN Z DISOC) forming a base. The FONBLIN Z derivative (FONBLIN Z DISOC) forming a base may be used at a concentration of 1 to 10 mass %. If the FONBLIN Z derivative (FONBLIN Z DISOC) forming a base is used at a maximum concentration of 5 mass %, the FONBLIN Z derivative (FONBLIN Z-60) is added at a concentration of 0.5 to 2.5 mass %, so that their proportions may always be equal. A higher concentration of the base, however, tends to give a shorter dust-free life.

(2) The torque tests are conducted at a radial load of 25 N and 50 N in a vacuum atmosphere at room temperature. Example 3 and Comparative Example are evaluated. Example 3 gives a torque of 0.01 to 0.02 N-m at a radial load of 25 N and a torque of 0.02 to 0.03 N-m at a radial load of 50 N as a result of the tests up to 50 km, while Comparative Example gives a torque of 0.02 to 0.03 N-m at a radial load of 25 N and a torque of 0.04 to 0.05 N-m at a radial load of 50 N, as shown graphically in FIG. 8. Thus, the product of Example 3 enables a considerable reduction of torque to about a half of that found on Comaparative Example.

The results of the torque life tests confirm the outstanding advantage of Example 3 over Comparative Example. This is apparently due to the fact that, as the added component does not combine with the base component, but retains fluidity, it exhibits a lubricating action and thereby contributes to reducing the torque.

This invention is not limited by the Examples as described above, but various modifications or variations thereof are possible.

Figure 9:
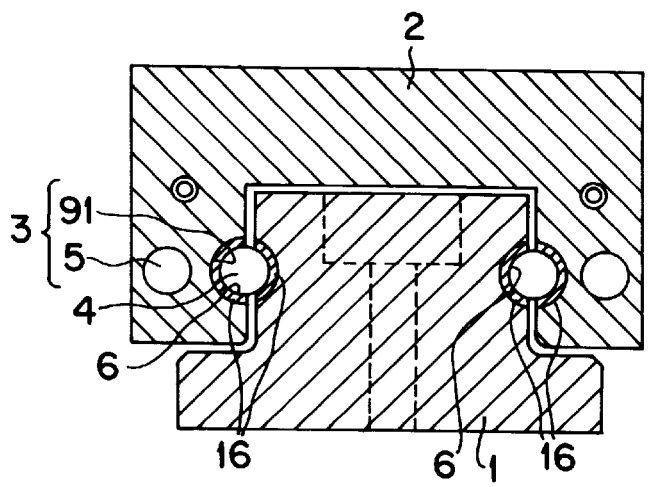
FIG. 9 is a perspective view of a direct-acting guide according to another embodiment of this invention.
Figure 10:
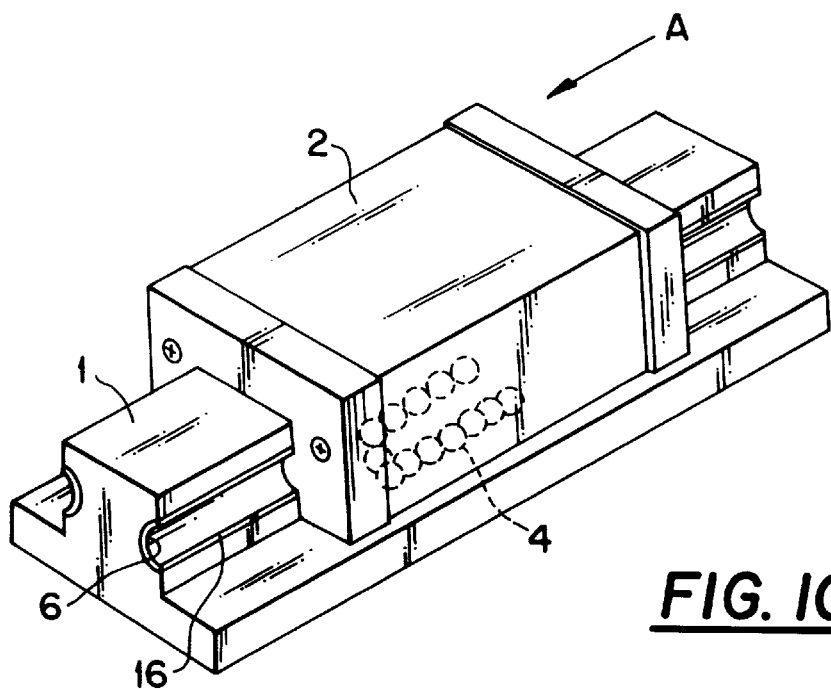
FIG. 10 is a transverse sectional view of FIG. 9.
Figure 11:
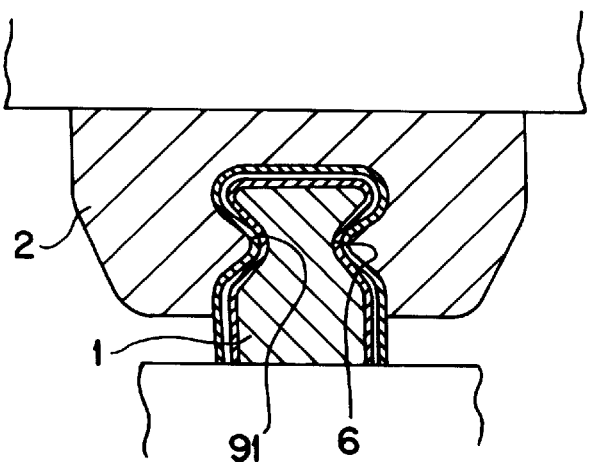
FIG. 11 is a transverse sectional view of a direct-acting guide according to still another embodiment of this invention.

(1) This invention is applicable to, for example, a direct-acting bearing for a direct guide having a saddle-shaped movable body 2 mounted on a rectangular rail 1 as shown in FIGS. 9 and 10, besides the direct-acting ball bearing as described above in connection with the Examples. This invention is also applicable to a bearing of the type not having any rolling body, as shown in FIG. 11. In either event, a soldi film 16 is formed on at least the rolling and sliding portions.

(2) The energy of electromagnetic radiation (light), such as ultraviolet or infrared radiation, γ-rays or electron beams, can be employed instead of heating for the curing treatment as described at (c) before.

(3) The drying treatment as described at (b) before can be omitted.

(4) Although the solid film 16 of a fluorine-containing polyurethane high molecular compound has been described as being formed on all of the rail 1, movable body 2, retainer 3, and balls 4, it can alternatively be formed only on either the rail 1, movable body 2 and retainer 3, or the balls 4.

(5) Although the solid film 16 has been described as being formed on the outer surfaces of the portions to be coated, too, it can alternatively be formed only on the surfaces defining the grooves 6 of the rail 1, the grooves 91 of the movable body 2 and the annular grooves 32 of the retainer 3. ps In this case, all the portions not to be coated are masked, and the individual components of the direct-acting bearing are dipped prior to assembly in the solution as prepared at (a) before, and the film is cured. The solid film 16 formed on the outer surfaces, too, however, ensures an improved effect in preventing the corrosion of the bearing in a corrosive environment, and eliminates the necessity for any additional treatment for preventing its corrosion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for forming a lubricating film on a direct-acting bearing, said direct-acting bearing having components including rolling and sliding portions, said process comprising the steps of:

forming a liquid film on at least the rolling and sliding portions of the components of said direct-acting bearing by using a solution prepared by diluting a fluorine-containing polymer having isocyanate groups as functional groups in a solvent; and curing said liquid film to form a solid film of a fluorine-containing polyurethane high molecular compound having a network structure.

2. The process for forming a lubricating film on a direct-acting bearing according to claim 1, wherein said step of diluting with a solvent includes the step of diluting with a fluorine-containing solvent.

3. A process for forming a lubricating film on a direct-acting bearing, said direct-acting bearing having components including rolling and sliding portions, said process comprising the steps of:

forming a liquid film on at least the rolling and sliding portions of the components of said direct-acting bearing by using a solution prepared by diluting in a solvent a mixture of a fluorine-containing polymer having isocyanate groups as functional groups and a fluorine-containing polymer containing at least one of hydroxyl, amino and carboxyl groups; and curing said liquid film to form a solid film of a fluorine-containing polyurethane high molecular compound having a network structure.

4. The process for forming a lubricating film on a direct-acting bearing according to claim 2, wherein said step of diluting with a solvent includes the step of diluting with a fluorine-containing solvent.

5. A process for forming a lubricating film on a direct-acting bearing, said direct-acting bearing having components including rolling and sliding portions, said process comprising the steps of:

forming a liquid film on at least the rolling and sliding portions of the components of said direct-acting bearing by using a solution obtained by adding a fluorine-containing polymer having no functional group to a first solution prepared by diluting in a solvent a fluorine-containing polymer having isocyanate groups as functional groups, or a second solution comprising a mixture of said first solution and a fluorine-containing polymer containing at least one of hydroxyl, amino and carboxyl groups; and curing said liquid film partially to form a solid film of a fluorine-containing polyurethane high molecular compound having a network structure in which the fluorine-containing polymer having no functional group is dispersed, while retaining its fluidity.

6. The process for forming a lubricating film on a direct-acting bearing according to claim 5, wherein said step of diluting with a solvent includes the step of diluting with a fluorine-containing solvent.

* * * * *